(12) United States Patent
Gibson et al.

(10) Patent No.: US 9,858,536 B2
(45) Date of Patent: Jan. 2, 2018

(54) SYSTEMS AND METHODS FOR FACILITATING EFFICIENCIES IN INVENTORY MANAGEMENT AND CONTROL

(71) Applicant: XEROX Corporation, Norwalk, CT (US)

(72) Inventors: George Gibson, Fairport, NY (US); Linn C. Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 596 days.

(21) Appl. No.: 14/108,395

(22) Filed: Dec. 17, 2013

(65) Prior Publication Data

US 2015/0170059 A1    Jun. 18, 2015

(51) Int. Cl.
| | |
|---|---|
| G06Q 10/08 | (2012.01) |
| G06Q 20/20 | (2012.01) |
| G06Q 10/00 | (2012.01) |
| G06Q 10/06 | (2012.01) |
| G06F 21/10 | (2013.01) |

(52) U.S. Cl.
CPC ................................... *G06Q 10/00* (2013.01)

(58) Field of Classification Search
USPC .................................... 705/57, 28; 235/385
See application file for complete search history.

(56) References Cited

U.S. PATENT DOCUMENTS

| | | | | |
|---|---|---|---|---|
| 2010/0065632 | A1* | 3/2010 | Babcock | G06Q 10/08 235/385 |
| 2011/0070834 | A1* | 3/2011 | Griffin | G06K 7/0008 455/41.1 |
| 2011/0186461 | A1* | 8/2011 | Poitevin | B65D 5/48002 206/475 |
| 2013/0080289 | A1* | 3/2013 | Roy | G06Q 10/10 705/26.8 |
| 2015/0254677 | A1* | 9/2015 | Huxham | G06K 19/0709 705/57 |

* cited by examiner

*Primary Examiner* — Scott Zare
*Assistant Examiner* — Reva R Danzig
(74) *Attorney, Agent, or Firm* — Caesar Rivise, PC

(57) ABSTRACT

A system and method provide automated identification mechanisms that facilitate efficiencies in inventory monitoring, management and control, including reducing labor costs associated with product placement, product inventorying, and shelf stocking/re-stocking in retail marketing scenarios, and advising consumers/customers regarding product pricing, promotional, nutritional and other information. Near field communication or other similar identification devices are embedded in retail-ready composite packaging. The embedded communication and identification devices provide identification information regarding the product with which the packaging is associated to a wireless reader device as a retailer's employee walks by a set of shelves stocked with an assortment of such packaged products. Mechanisms are included for tracking the addition or removal of items from the retail-ready container. These other mechanisms include establishing communication between a printed antenna in the retail-ready container and a magnet in the label of each individual item that generate a voltage spike when passed by the antenna.

20 Claims, 4 Drawing Sheets

SYSTEMS AND METHODS FOR FACILITATING EFFICIENCIES IN INVENTORY MANAGEMENT AND CONTROL

BACKGROUND

1. Field of the Disclosed Embodiments

This disclosure relates to systems and methods for providing automated identification mechanisms that facilitate improved efficiencies in inventory monitoring, management and control, including reducing labor costs associated with product placement, product inventorying, and shelf stocking/re-stocking in retail marketing scenarios, and advising consumers/customers regarding product pricing, promotional, nutritional and other information.

2. Related Art

Retail marketing continues to represent an incredibly competitive economic space. Technologic advances have had profound effects on all aspects of the retail marketplace. In a first instance, a substantial percentage of the retail shopping experience, and everyday retail purchase of certain classes of consumer products and goods, has moved to the Internet in an increasingly prolific online marketplace. The online marketplace continues to grow in certain areas including online catalog purchase of consumer electronics, clothing, and other assorted goods that have proven particularly adaptable to online purchase, both for direct delivery to the consumer/customer, or for being picked up by the consumer/customer at a local outlet of a traditional brick and mortar store, thereby streamlining the buying and delivery experience. Online marketing is highly incentivized to attempt to increase its popularity to an increasing percentage of the consumer/customer population. Among the savings realized by the retailers in providing these streamlined shopping experiences to the satisfaction of consumers/customers is a percentage decrease in labor costs based on requiring comparatively fewer employees in a given retailers' location to support the consumer/customer needs in support of a satisfying shopping experience.

There remain, however, significant portions of the retail marketplace that are less amenable to the transition to online shopping. In this regard, local and national chain grocery stores, drug stores, hardware stores, sporting goods stores, automotive parts stores and the like still have their place in the traditional brick and mortar mold supporting significant levels of customer foot traffic daily, even on "holidays." There have also emerged combination and/or "big box" stores selling a broad spectrum of the products sold by the more specialized outlets and other classes of products.

Regardless of the venue, the retail marketplace is very competitive and extremely sensitive to supporting the highest levels of customer satisfaction. As such, even the traditional brick and mortar stores have embraced certain levels of technologic advancement to enhance their customers' shopping experiences. Store owners and store owner entities expend significant money and time optimizing product placement, presenting aesthetically pleasing retail environments and creating advertising and incentives, all of which efforts are directed at enticing consumers/customers to choose to shop in their stores rather than in the stores of their competitors.

Like their retailer counterparts, product manufacturers and/or suppliers understand the importance of improving the customers' shopping experience as well, particularly in directing retail consumer/customer attention to their products even when placed by the retailers in close proximity to their competitors' goods in the retail environment.

Control of labor and other ancillary costs can be as important for product manufacturers and suppliers as it is for retail store owners and store owner entities, as each seeks to position themselves to most effectively secure and improve their share of the walking consumer/customer population. One example of an area that has seen improvement based on study and application of product and product packaging research and development has been objectively directed at reducing the labor costs in retail store management attributable to inventory monitoring, management and control, including shelf stocking and re-stocking, through the use of innovative modular product packaging, often referred to as shelf-ready packaging (SRP) and/or retail-ready packaging (RRP).

A recent report explained that a large supplier of certain food products undertook directed efforts to increase the ease of handling its products in a manner that had the benefit of aiding the retail store owners in reducing stocking and re-stocking costs through large-scale adoption of increasingly retail-ready or shelf-ready packaging. The supplier studied and implemented what they considered to be a functional, easy-open design for a carton containing multiple individual product packages, the cartons themselves having printed graphics identifying the product boxed therein, and being configured to significantly reduce the steps needed for the retailer to stock numbers of the individual product containers on a shelf. This reported concept, and other like concepts, surrounds use of cases of products that are specifically configured to fit an existing footprint for the supplier's products on the retailer's shelves. The packaging design promotes ease of customer recognition, navigation and use as the customer shops, while being sturdy enough to withstand the rigors of moving through the supply chain from the supplier's packaging site to the retailer's shelf.

What has emerged is a class of increasingly higher technology packaging that often allows a retailer to simply place a pre-cut, comparatively easy opening large carton containing increased numbers of individually-packaged product items directly on the retailer's store shelves rather than opening the more traditional generic brown cartons, and requiring employees of the retailer to stack the individually-packaged product items one-by-one on the shelves. These and other related approaches to packaging benefit the retailers in reducing labor costs by significantly reducing the piece per touch number of product items that retailers' employees are required to touch, stack, align, or otherwise manipulate, in the shelf stocking and re-stocking processes. The implementation of such innovative packaging efforts can also produce other benefits, some of which may be realized by the suppliers as well, including promoting consumer/customer satisfaction in the shopping process for the suppliers' products and realizing significant savings and reduced waste with regard to packaging materials.

SUMMARY OF THE DISCLOSED SUBJECT MATTER

The use of new packaging approaches such as those outlined above is helpful, but may not exploit the fullest advantages of use of the shelf-ready or retail-ready packaging. Inventory monitoring, management and control still requires labor intensive individual product counting and manual data entry, for example, in a hand-held device. Comparatively slow, labor intensive and limitedly responsive physical counting may lead to lost opportunity costs for failing to detect, in a timely enough manner, the need for re-order, re-stock or re-supply leading to consumer/customer dissatisfaction. Retailers must maintain some balance between expending manpower and maintaining timeliness of inventory manipulation. Manual effort according to conventional schemes must still be expended in aligning the shelf-ready and retail-ready packaging with on-shelf signage. Further, the packaging and signage must be reviewed and/or otherwise checked to ensure that they agree according to, for example, current advertising, versioning and/or pricing policies and schemes. These alignment requirements continue to necessitate labor-intensive physical matching. The required physical matching, and continued requirements associated with the often extensive manual counting and record keeping disadvantageously reduce potential efficiency gains available according to use of the new packaging approaches.

Objectives remain to further reduce the ongoing reliance on the manually labor intensive nature of conventional inventory monitoring, management and control, including and particularly with regard to retail shelf stocking and re-stocking in big box stores. Efforts to ensure that products are available, and easily-recognizable, in quantities to support consumer/customer needs are all important in supporting the quality of the consumer/customer retail shopping experience. Failures in this regard, which may lead to customers being inconvenienced in having to forego a particular item, or at least in having to ask for assistance, increase detrimental consumer/customer dissatisfaction. Consumer/customer reaction may be to leave behind an entire order based on the absence of one or more items that the consumer/customer particularly wanted to purchase. In the highly competitive marketplace that is retail marketing, any amount of consumer/customer dissatisfaction can cause significant parts of a consumer/customer population to flex to the competition. As such, the retailer that can best enhance the ease of the consumer/customer retail shopping experience to increase consumer/customer satisfaction will be better placed to beat the competition.

In view of the above ongoing areas for potential improvement in the retail shopping experience through the application of technologic advancement and innovation in the conventional brick and mortar retail marketplace, it would be advantageous to provide systems and methods that further reduce the requirements for direct manual manipulation and/or input in all aspects of inventory monitoring, management and control within a particular retailer location, including, but not limited to, product counting, and alignment of products, on store shelves.

Exemplary embodiments of the systems and methods according to this disclosure may implement techniques to further reduce reliance on direct physical manual contact between retail employees and the individual products provided on store shelves.

Exemplary embodiments may further enhance advantages realizable by retailers through the proliferation of shelf-ready or retail-ready packaging that modularizes a supplier's products in a manner that reduces the number of individual product touches required in shelf stocking, configuring, re-stocking, aligning, and the like.

Exemplary embodiments may embed near field communication (NFC), or other similar non-touch identification, devices in the shelf-ready or retail-ready composite packaging. In embodiments, the communication and/or identification devices may preferably be protectively placed in a customer-facing wall of a shelf-ready or retail-ready corrugated (or other) container.

Exemplary embodiments may program an embedded communication or non-touch identification device to provide appropriate identification information regarding the product with which the packaging is associated to a wireless reader device, for example, as a retailer sales associate simply walks by a set of shelves stocked with an assortment of such packaged products.

Exemplary embodiments may reduce a requirement for, and alignment with, additional supporting secondary physical signage because relevant data that is conventionally provided on additional signage may be supplied in the wirelessly readable packaging itself. A presence of a disclosed onboard (in-carton) intelligence capability may obviate the need for matching of the physical signage with the particular container and, as availability of a wireless reader capability for all employees and customers is implemented any need for additional physical on shelf signage at all may prove superfluous.

Exemplary embodiments may include mechanisms for tracking the addition or removal of items from the retail-ready container. These other mechanisms may include, but not be limited to, such techniques as embedding a printed antenna in the face of the retail-ready container through which items are withdrawn. A magnet in the label of each individual item may generate a voltage spike which could be tallied by an embedded communication or non-touch identification device thereby keeping continuous inventory and being able to report when polled.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for providing automated identification mechanisms for facilitating improved efficiencies in inventory monitoring, management and control, including reducing labor costs associated with product placement and shelf stocking/re-stocking in retail marketing scenarios, will be described, in detail, with reference to the following drawings, in which.

DETAILED DESCRIPTION OF THE DISCLOSED EMBODIMENTS

Figure 1:
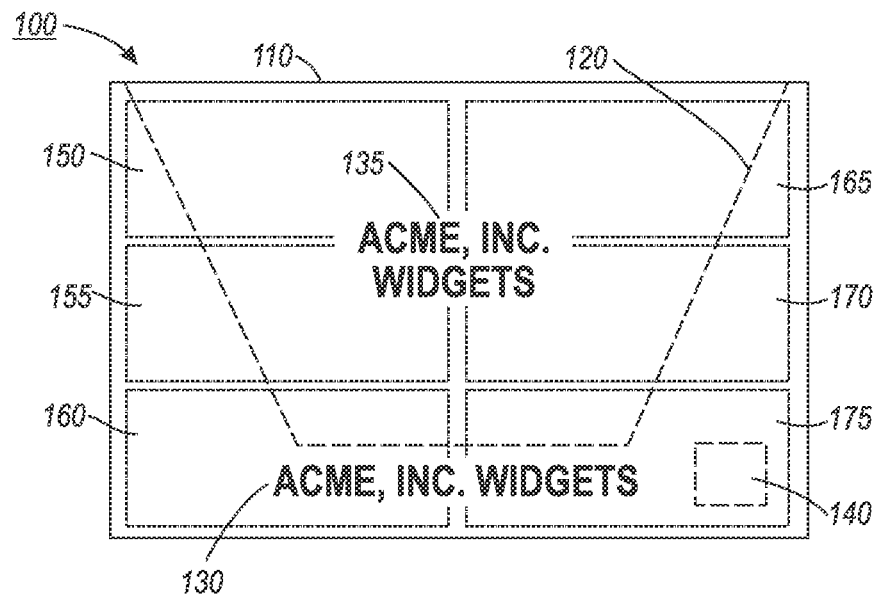
FIG. 1 illustrates a first exemplary embodiment of a shelf ready packaging carton (closed) modified with a wireless identification and communication device according to this disclosure.

The systems and methods for providing automated identification mechanisms for facilitating improved efficiencies in inventory monitoring, management and control, including reducing labor costs associated with product placement and shelf stocking/re-stocking in retail marketing scenarios according to this disclosure will generally refer to this specific utility for those systems and methods. Exemplary embodiments described and depicted in this disclosure should not be interpreted as being specifically limited to any particular configuration of a wireless communicating device and/or a shelf-ready or retail-ready packaging carton modified with a wireless identification and communication device for implementing improved inventory monitoring, management and control, or directed to any particular limiting intended use. In fact, any wireless communicating and identification scheme that may benefit from the systems and methods according to this disclosure is contemplated.

Specific reference to, for example, any particular configuration for retail marketing packaging, including any specific configuration of a shelf-ready or retail-ready packaging container that encloses a plurality of individual product packages, should be understood as being exemplary only, and not limited, in any manner, to any particular class or configuration of such packaging. The systems and methods according to this disclosure will be described as being particularly adaptable to use in consumer/customer retail scenarios, including labor intensive shelf inventorying, stocking and re-stocking, and in support of overarching inventory monitoring, management and control schemes, but should not be considered as being limited to devices that are akin to those conventionally used for providing manual input inventorying and inventory monitoring. Any commonly known portable or handheld unit, usable for manual input inventorying and inventory monitoring, management and control, that may be adaptable for wireless communication with a wireless identification and communication device embedded in a multi-unit carton according to the specific capabilities discussed in this disclosure is contemplated.

The disclosed embodiments may advantageously leverage available wireless communicating technologies, and particularly extremely short range wireless communicating technologies embodied, for example, in near field communication (NFC) or similar devices that may be embedded in the secondary packaging that is a necessary component of shelf-ready packaging or retail-ready packaging to aid in inventory tracking, monitoring, management and control. These wireless identification and communication devices could be used to identify the products and product inventories, and further could be used to supply all manner of other product information, including current pricing information, promotional information (e.g., instant e-coupons), shelf-life information, nutritional information and/or other beneficial information to consumers/customers via cooperating wireless readers, or wireless reading applications. The wireless identification and communication devices may be used to link to web based features such as social networks, and/or CRM or related programs as applications, for example, in wireless consumer electronics including smartphones. Because the relevant data would be supplied in the carton packaging, and made available to consumers/customers through particularly-configured wireless readers or otherwise, for example with an application that may be included in the consumers'/customers' smartphones, a requirement for secondary physical signage may be reduced, or otherwise eliminated.

The disclosed wireless identification and communication device functionality may employ an approach where an NFC (or other) chip is laminated between a printed coversheet and a backer board of the secondary packaging carton. The wireless identification and communication device may be over-coated or laminated to protect the chip and the printed surface. In the case of an NFC as the wireless identification and communication device, for example, the chip can be programmed either before container assembly or after. The presence of the "on board" intelligence has many benefits for addressing inventory monitoring, management and control and, as indicated briefly above, may ultimately obviate any need for matching of the physical signage with the particular container as smart handsets become more prevalent for providing the information that may be captured on associated advertising and promotional materials.

Coupling the disclosed schemes and systems for in-carton intelligence in the secondary packaging carton through the use of a wireless identification and communication device with an appropriately "scannable" label on the individually-wrapped products could allow a record to be created whenever an individual item is removed from the secondary packaging carton as a retail-ready container. The scannable label may, for example, contain an RFID that may be polled for presence when energized by a nearby reader, communicating the inventory to the reader without the necessity of a physical count. This could be done simply by polling for the number of items with an appropriate reader. NFC is advantaged over RFID in this regard due to its relatively short range (~10 cm) and increased processing power.

Other mechanisms for tracking the addition or removal of items from the RRP can be used including embedding a printed antenna in the face of the container through which items are withdrawn. A magnet in the scannable label of each individual item would then generate a voltage spike which could be tallied by the NFC device keeping continuous inventory and being able to report when polled.

FIG. 1 illustrates a first exemplary embodiment 100 of a shelf-ready packaging carton (closed) modified with a wireless identification and communication device 140 according to this disclosure. As shown in FIG. 1, shelf-ready packaging generally includes an outer secondary packaging carton 110 that holds a plurality of individual product packages 150-175. The shelf-ready packaging is differentiated in at least three particular ways from earlier, more conventional generic corrugated cardboard packing cartons traditionally employed to assemble and transport numbers of individual product packages in bulk. First, the shelf-ready packaging is configured and sized to fit in a particular footprint on a retailer's shelf. Second, the outer secondary packaging carton 110 of the shelf-ready packaging is emblazoned with its own labeling 130,135 identifying the enclosed products to the consumers/customers. Third, the outer secondary packaging carton 110 of the shelf-ready packaging may be scored or otherwise pre-cut along a particular profile 120 to provide easy opening capability, and to render an aesthetically pleasing shelf presence once opened, exposing the collected individual product packages 150-175 for purchase.

Figure 2:
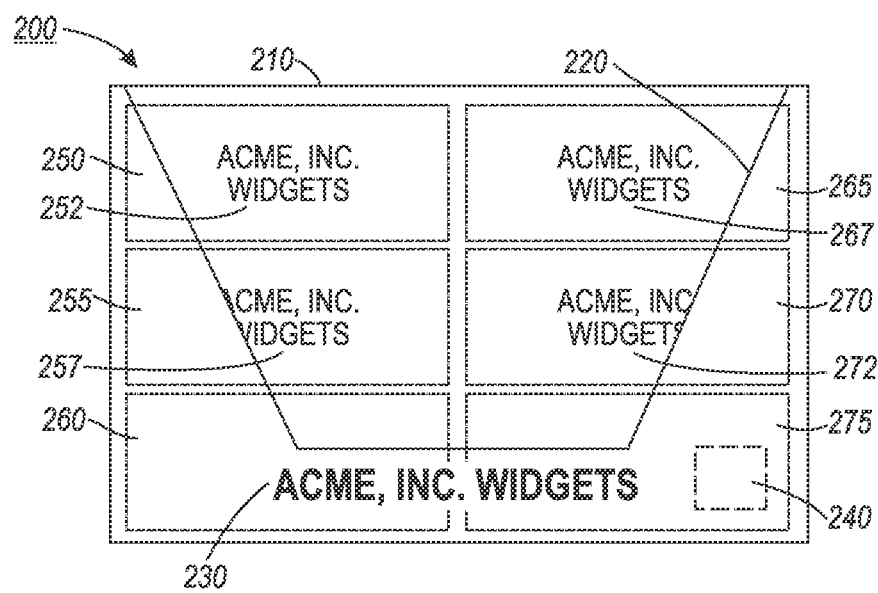
FIG. 2 illustrates a second exemplary embodiment of a shelf ready packaging carton (open) modified with a wireless identification and communication device according to this disclosure.

FIG. 2 illustrates a second exemplary embodiment 200 of a shelf-ready packaging carton (open) modified with a wireless identification and communication device 240 according to this disclosure. As shown in FIG. 2, the outer secondary packaging carton 210 has been opened along the scored or pre-cut profile 220 as the easy opening capability that renders the aesthetically pleasing and complementary shelf presence once opened. The opening along the scored or pre-cut profile exposes the collected plurality of individual product packages 250,255, 260,265,270,275. Certain of the outer carton labeling 230 may be designed to remain once the outer secondary packaging carton 210 is opened. The individual product packages 250,255,260,265,270,275 include their own labeling and signage 252,257,267,272 to identify the individual product packages 250,255,260,265, 270,275 as appropriate and separately from the remaining labeling 230 on the outer carton.

According to the exemplary embodiments shown in FIGS. 1 and 2, what has emerged is a class of increasingly higher technology packaging that allows a retailer to simply place the pre-cut, comparatively easy opening outer secondary packaging carton 110,210 containing increased numbers of individually-packaged items directly on the retailer's store shelves rather than opening the more traditional generic corrugated cardboard cartons, requiring employees of the retailer to stack the individually-packaged items one-by-one on the shelves. Shelf-ready packaging such as this benefit retailers in reducing labor costs by significantly reducing the piece per touch number of items that retailers' employees are required to touch, stack, align, or otherwise manipulate, in the shelf stocking or restocking processes.

Figure 3:
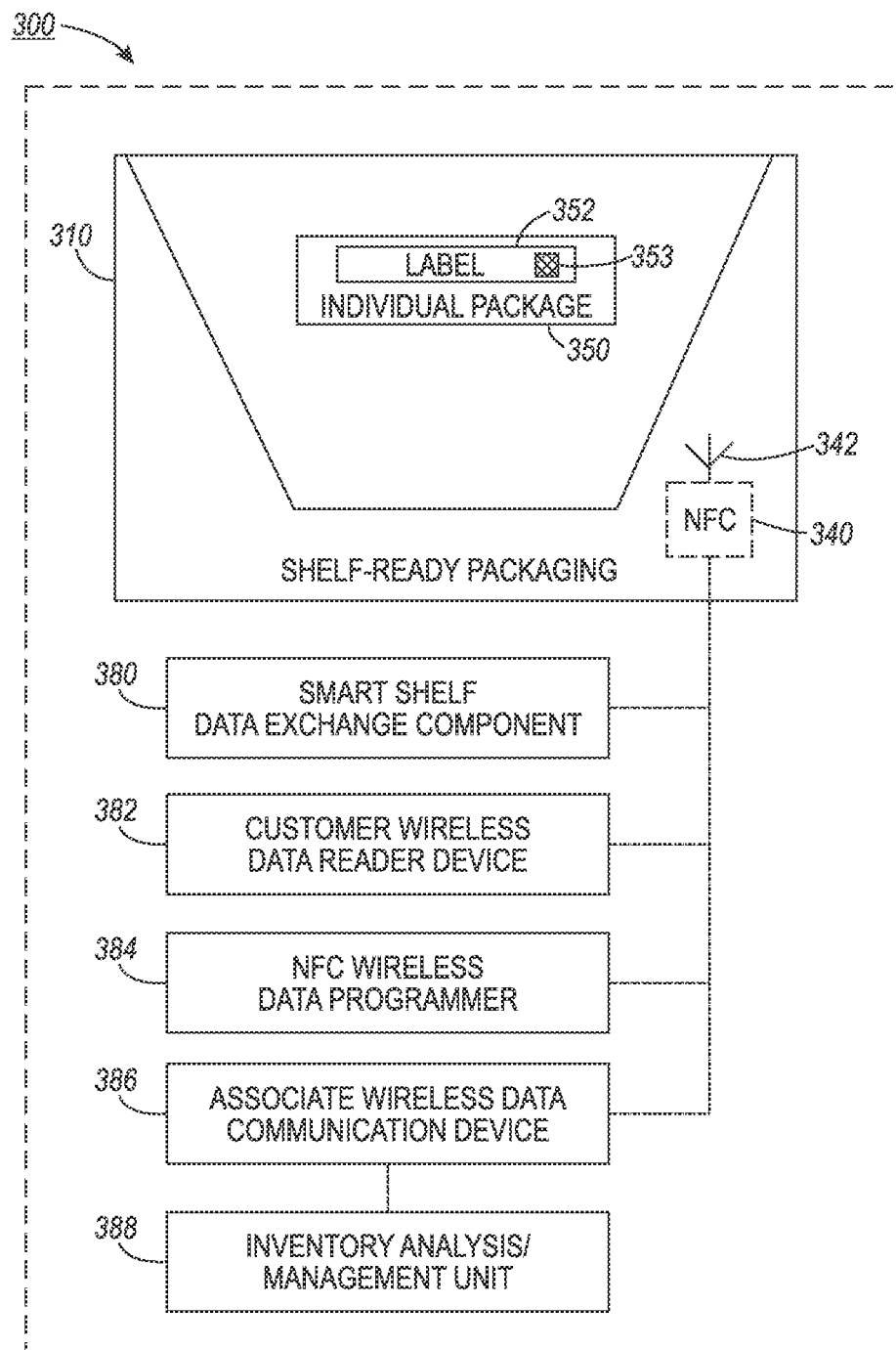
FIG. 3 illustrates a block diagram of an exemplary communication system for facilitating improved efficiencies in inventory management and control in retail marketing scenarios according to this disclosure.

FIG. 3 illustrates a block diagram of an exemplary communication system 300 for facilitating improved efficiencies in inventory management and control in retail marketing scenarios according to this disclosure. As shown in FIG. 3, an outer secondary packaging carton 310 of a shelf-ready packaging may be augmented with a wireless identification and communication device. In the depicted exemplary embodiment, the wireless identification and communication device is a near field communication (NFC) device 340, which may include a communicating antenna 342. The wireless identification and communication device may be preferably embedded in a customer-facing wall of the outer secondary packaging carton 310 of the shelf-ready packaging container.

To further exploit the advantages of the disclosed wireless identifying and communicating schemes, each individual package 350 of the plurality of individual packages in the an outer secondary packaging carton 310 of a shelf-ready packaging may include its own labeling 352 for coupling an in-carton intelligence with the labeling 352 to allow a record to be created whenever each individual package 350 is removed from the outer secondary packaging carton 310 of a shelf-ready packaging. One exemplary mechanism for tracking an addition or removal of each individual package 350 from the outer secondary packaging carton 310 may include using an embedded printed antenna, such as the communicating antenna 342 in the face of the outer secondary packaging carton 310 of a shelf-ready packaging through which items are withdrawn. A magnet 353 in the labeling 352 of each individual package 350 may generate a voltage spike which could be tallied by the NFC device 340 keeping continuous inventory of individual packages 350 and being able to report an immediate inventory of the individual packages 350 when polled.

A NFC wireless programmer 384 may be provided as a standalone unit or as a function of an associate wireless data communication device 386 to program the NFC 340 provide appropriate or updated identification information regarding the products contained in each individual package 350. The provided or updated information may include current pricing, promotional (e.g., instant e-coupons), shelf-life, nutritional or other beneficial information to consumers/customers. The information may be provided, updated or removed according to a current date. The wealth of information that may be storable to be read, for example, by information a customer wireless data reader device 382 may be of such a volume that it may not fit on individual product labeling or packaging and, even if it were, it would be substantially unchangeable with regard to delivered and shelved products.

Additionally, the associate wireless data communication device 386 with which the NFC 340 may be associated may be employed by a retailer sales associate as the retailer sales associate simply walks by a set of shelves stocked with an assortment of such packaged products. An associate wireless data communication device 386 may be associated with the NFC 340, or an RFID, to, for example, poll for presence when energized by the associate wireless data communication device 386, communicating the inventory to the associate wireless data communication device 386 without the necessity of a physical count. This could be done simply for polling for the number of items with the associate wireless data communication device 386. In such an application, NFC is advantaged over RFID due to its relatively short range (~10 cm), allowing for discrimination of closely positioned differentiable product packages, and increased processing power.

The associate wireless data communication device 386 may have an internal processing capability, or may be separately in communication with a collecting and processing capability, such as an inventory analysis/management unit 388 in the form of a server or separate computing device. In either case, an inventory analysis algorithm or scheme may be applied to quickly determine presence, and numbers of, individual packages 350 and to advise that stocking or restocking of the shelves with a particular product may be appropriate. This indication would be provided without a need to individually count the remaining individual packages 350. Further, analyzing the information with the associate wireless data communication device 386, or downloading the information accumulated from routine aisle scans using the associate wireless data communication device 386 to the inventory analysis/management unit 388 may offer an opportunity for a retailer to better analyze sales data in a manner that allows for higher level decisions to be made regarding product placement and inventory requirements with regard to specific products, including restocking using on-hand inventories within the retail location, or re-ordering to replenish on hand inventories expectedly or unexpectedly depleted, or based on an anticipated depletion.

A customer wireless data reader device 382 may be used to read the stored current pricing, promotional (e.g., instant e-coupons), nutritional or other benefit information by consumers/customers, the customer wireless data reader device 382 being attached, for example, to a shopping cart or basket. Otherwise, the customer wireless data reader device 382 may involve the NFC 340 linking to web-based features such as social networks, customer relationship management (CRM) applications or related programs that may be provided as applications readable by smartphones as the customer wireless data reader device 382.

Smart shelf data exchange component(s) 380 may be provided in the retailers shelving to aid in product alignment, or to simply amplify individual signals emanating from the NFC(s) 340.

Figure 4:
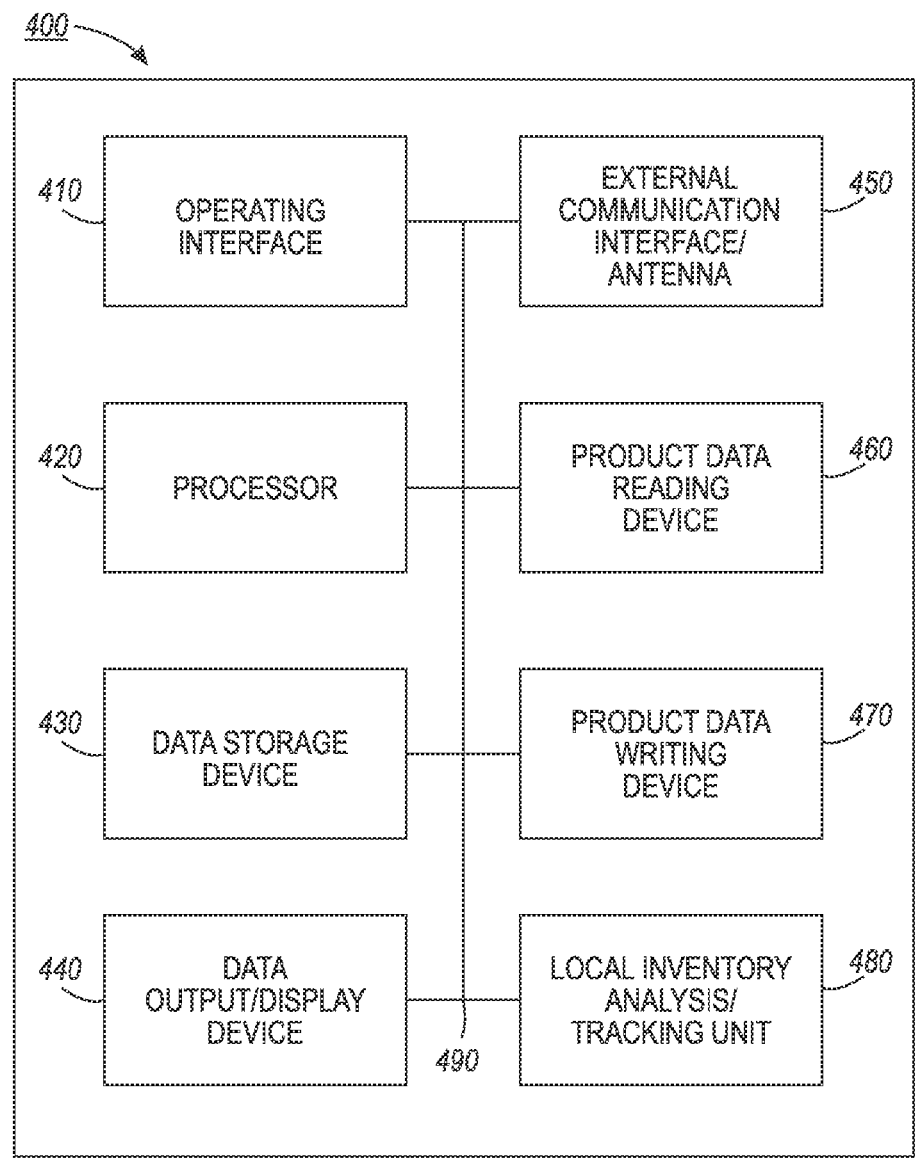
FIG. 4 illustrates a block diagram of an exemplary wireless communicating device for facilitating improved communication with shelf ready packaging cartons according to this disclosure.

FIG. 4 illustrates a block diagram of an exemplary wireless communicating device 400 for facilitating improved communication with shelf ready packaging cartons according to this disclosure. Components of the exemplary wireless communicating device 400 shown in FIG. 4 may be, for example, housed in a wireless data identification and/or communication device or in an inventory analysis and/or management unit, including for example in a separate server or computing device that may be monitored and managed by a device management application.

The exemplary wireless communicating device 400 may include an operating interface 410 by which a retailer's employee, for example, may communicate with the exemplary wireless communicating device 400, or otherwise by which the exemplary wireless communicating device 400 may receive instructions input to it from another source. In instances where the operating interface 410 may be a locally accessible user interface, the operating interface 410 may be configured as one or more conventional mechanisms common to computing and/or communicating that permit a user to input information to the exemplary wireless communicating device 400. The operating interface 410 may include, for example, a conventional keyboard and mouse, a touchscreen with "soft" buttons or with various components for use with a compatible stylus, a microphone by which a user may provide oral commands to the exemplary wireless communicating device 400 to be "translated" by a voice recognition program, or other like device by which a user may communicate specific operating instructions to the exemplary wireless communicating device 400.

The exemplary wireless communicating device 400 may include one or more local processors 420 for individually operating the exemplary wireless communicating device 400 and for carrying out processing, data collection, wireless data programming, reporting and control functions. Processor(s) 420 may include at least one conventional processor or microprocessor that interprets and executes instructions to direct specific data monitoring and analysis functions with regard to product information and inventory data when the exemplary wireless communicating device 400 is made to communicate with individual wireless identification and communication devices associated with retail packaging according to this disclosure. Processor(s) 420 may initiate and control of certain communication, data collection and analysis efforts with respect to inventory monitoring, management and control.

The exemplary wireless communicating device 400 may include one or more data storage devices 430. Such data storage device(s) 430 may be used to store data, inventory data or operating programs to be used by the exemplary wireless communicating device 400, and specifically the processor(s) 420, in carrying out the inventory monitoring, management and control functions for the exemplary wireless communicating device 400. Data storage device(s) 430 may be used to collect and store product identifying information as discussed in detail above, and to store programs for executing any or all of the functions of the exemplary wireless communicating device 400, as also described above. The data storage device(s) 430 may include a random access memory (RAM) or another type of dynamic storage device that is capable of storing collected information, and separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary wireless communicating device 400, or may be provided external to, and in wired or wireless communication with, the exemplary wireless communicating device 400.

The exemplary wireless communicating device 400 may include at least one data output/display device 440 which may be configured as one or more conventional mechanisms that output information to a user, including a graphical user interface (GUI) for the exemplary wireless communicating device 400. The data output/display device 440 may be usable to display to a user an indication of operation of the exemplary wireless communicating device 400 and/or of some inventory management or control function that should be carried out based on collected inventory information.

The exemplary wireless communicating device 400 may include one or more separate external communication interface(s)/antenna(s) 450 by which the exemplary wireless communicating device 400 may communicate with wireless identification and communication devices in retail product packaging to carry out the inventory monitoring, management and control functions. When analysis functions are to be conducted by systems or devices external to the exemplary wireless communicating device 400, at least one external communication interface/antenna 450 may be configured specifically to facilitate communication between the exemplary wireless communicating device 400 and one or more local inventory analysis and tracking unit(s) 480. At least one external communication interface/antenna 450 may be configured to communicate with product warehouses or suppliers via known means to obtain product information or to exchange inventory management and control information. No particular limiting configuration to the external communication interface(s)/antenna(s) 450 is to be implied by the depiction in FIG. 4, other than that the external communication interface(s)/antenna(s) 450 may be configured to connect to external components via one or more available wired or wireless communication pathways or links.

The exemplary wireless communicating device 400 may include one or more of a product data reading device 460 and a product data writing device 470, each or both of which may be a part or a function of processor 420 coupled to, for example, one or more storage devices 430, or may be one or more separate stand-alone component module(s) or circuit(s) in the e exemplary wireless communicating device 400. The one or more of a product data reading device 460 and a product data writing device 470 may provide information to, or read information from, the wireless identification and communication devices associated with retail packaging in the retails marketplace.

The exemplary wireless communicating device 400 may include a local inventory analysis/tracking unit 480 that may be used to carry out the inventory monitoring, management and control functions described above, particularly by manipulating and analyzing the product information received from the wireless identification and communication devices associated with the retail packaging as it is read be the exemplary wireless communicating device 400.

All of the various components of the exemplary wireless communicating device 400, as depicted in FIG. 4, may be connected by one or more data/control busses 490. These data/control busses 490 may provide wired or wireless communication between the various components of the exemplary wireless communicating device 400, whether all of those components are housed integrally in, or are otherwise external and connected to, the exemplary wireless communicating device 400.

It should be appreciated that, although depicted in FIG. 4 as what appears to be an integral unit, the various disclosed elements of the exemplary wireless communicating device 400 may be arranged in any combination of sub-systems as individual components or combinations of components, integral to a single unit, or external to, and in wired or wireless communication with the single unit of the exemplary wireless communicating device 400. In other words, no specific configuration as an integral unit or as a support unit is to be implied by the depiction in FIG. 4. Further, although depicted as individual units for ease of understanding of the details provided in this disclosure regarding the exemplary wireless communicating device 400, it should be understood that the described functions of any of the individually-depicted components may be undertaken, for example, by one or more processors 420 connected to, and in communication with, one or more data storage devices 430.

Figure 5:
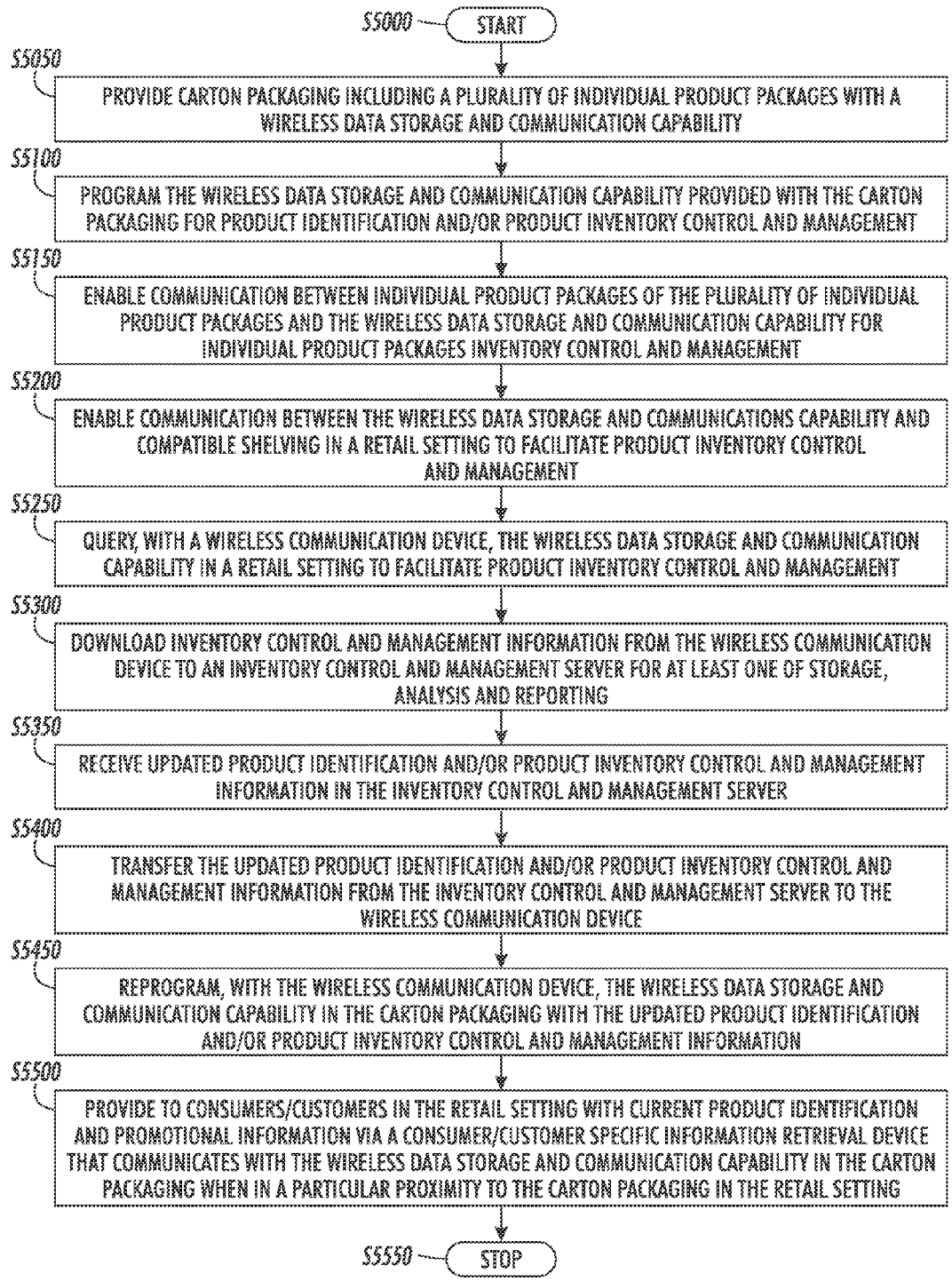
FIG. 5 illustrates a flowchart of an exemplary method for facilitating improved communication with shelf-ready packaging cartons according to this disclosure.

The disclosed embodiments may include an exemplary method for facilitating improved communication with shelf-ready packaging cartons. FIG. 5 illustrates a flowchart of such an exemplary method. As shown in FIG. 5, operation of the method commences at Step S5000 and proceeds to Step S5050.

In Step S5050, a carton packaging including a plurality of individual product packages may be provided with a wireless data storage and communication capability. The wireless data storage and communication capability may be provided as an embedded near field NFC or similar device in a customer-facing wall of the carton packaging. The NFC or other chip may be laminated between the printed coversheet and a backer board and may involve an over-coating or lamination to protect the chip and the printed surface of the carton packaging. Operation of the method proceeds to Step S5100.

In Step S5100, the wireless data storage and communication capability provided with the carton packaging may be programmed prior to placement on the carton packaging, after placement on the carton packaging or once the carton packaging is placed in a retail environment for use. The programming may include any or all of the elements of product information outlined above, the information being usable for product identification and/or product inventory monitoring, management and control. Operation of the method proceeds to Step S5150.

In Step S5150, wireless data communication may be enabled between individual product packages of the plurality of individual product packages and the wireless data storage and communication capability in the carton packaging for individual product package inventory monitoring, management and control. Operation of the method proceeds to Step S5200.

In Step S5200, wireless data communication may be enabled between the wireless data storage and communication capability and compatible shelving in a retail setting to facilitate product inventory monitoring, management and control. Operation of the method proceeds to Step S5250.

In Step S5250, a wireless communication device may be used to query the wireless data storage and communication capability in a retail setting to facilitate product inventory monitoring, management and control. Operation of the method proceeds to Step S5300.

In Step S5300, inventory monitoring, management and control information may be downloaded from the wireless communication device to an inventory monitoring, management and/or control server for at least one of storage, analysis and reporting of the collected inventory monitoring, management and control information. Operation of the method proceeds to Step S5350.

In Step S5350, updated product identification and/or product inventory monitoring, management and control information may be received in the inventory monitoring, management and control server. Operation of the method proceeds to Step S5400.

In Step S5400, the updated product identification and/or product inventory monitoring, management and control information may be transferred from the inventory monitoring, management and control server to the wireless communication device. Operation of the method proceeds to Step S5450.

In Step S5450, the wireless communication device may be used to reprogram the wireless data storage and communication capability in the carton packaging with the updated product identification and/or product inventory monitoring, management and control information. Operation of the method proceeds to Step S5500.

In Step S5500, consumers/customers in the retail setting may be provided with current product identification and promotional information via a consumer/customer specific information retrieval device that communicates with the wireless data storage and communication capability in the carton packaging when in a particular proximity to the carton packaging in the retail setting. Operation of the method proceeds to Step S5550, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 5, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each wireless identification and communication device operated by numerous individuals in, or associated with, a plurality of retail sites. Each wireless identification and communication device may include some portion of the disclosed system and execute some portion of the disclosed method but not necessarily all of the system components or method steps.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method for managing inventory, comprising:
   receiving first packaging enclosing a plurality of products individually enclosed in second packaging, a first wireless communicating device being a near field communication device of limited range embedded in the first packaging with product information regarding the plurality of products enclosed in the first packaging being stored in the first wireless communicating device, the second packaging enclosing respective ones of the plurality of products each including a label with a magnet;
   generating a voltage spike by the magnet when placed within the limited range of the near field communication device of the first wireless communicating device;
   tallying respective ones of the plurality of products for each of the voltage spikes;
   establishing communication between a second wireless communicating device and the first wireless communicating device to collect stored product information, the second wireless communicating device being different than the plurality of products or magnets thereof;
   analyzing, with a processor, the product information collected by the second wireless communicating device; and
   directing, with the processor, an output of the analysis to a user of the second wireless communicating device.

2. The method of claim 1, the first packaging being a retail-ready packaging container, the retail-ready packaging including a pre-scored opening portion and labeling separately identifying the enclosed products apart from labeling on the individually enclosed second packaging.

3. The method of claim 2, the first wireless communicating device being embedded in a customer-facing surface of the first packaging.

4. The method of claim 1, the processor being located in the second wireless communicating device.

5. The method of claim 1, further comprising downloading the collected product information from the second wireless communicating device to a separate computing device, the processor being located in the separate computing device.

6. The method of claim 1, further comprising receiving updated product information with the processor via at least one of a manual input from a user or through communication with a product information source other than the first wireless communicating device.

7. The method of claim 6, further comprising:
   communicating the updated product information to the first communicating device with the second communicating device; and
   storing the updated product information in the first communicating device.

8. The method of claim 1, further comprising communicating the stored product information to a third wireless communicating device, the third wireless communicating device being one of a stand-alone receive-only wireless communicating device or an Internet-enabled wireless communicating device including a product information receiving application.

9. The method of claim 8, the stored product information being communicated to the third wireless communicating device automatically based on a proximity of the third wireless communicating device to the first wireless communicating device.

10. The method of claim 1, the stored product information including one or more of product identification information, product pricing information, product promotional information, product nutritional information, and product shelf-life information.

11. The method of claim 1, wherein the establishing one-way only communication from the second packaging to only the first wireless communicating device communicates a tallyable event of the second packaging.

12. A system for managing inventory, comprising:
    first packaging enclosing a plurality of products individually enclosed in second packaging;
    a first wireless communicating device being a near field communication device of limited range embedded in the first packaging with product information regarding the plurality of products enclosed in the first packaging being stored in the first wireless communicating device, the second packaging enclosing respective ones of the plurality of products each including a label with a magnet, the magnet configured for:
       generating a voltage spike by the magnet when placed within the limited range of the near field communication device of the first wireless communicating device, and
       tallying respective ones of the plurality of products for each of the voltage spikes;
    a second wireless communicating device for communicating with the first wireless communicating device to collect stored product information from the first wireless communicating device, the second wireless communicating device being different than the plurality of products or magnets thereof;
    an inventory management processor that analyzes the product information collected by the second wireless communicating device; and
    an output device that outputs a result of the analysis to a user.

13. The system of claim 12, the first packaging being a retail-ready packaging container, the retail-ready packaging including a pre-scored opening portion and labeling separately identifying the enclosed products apart from labeling on the individually enclosed second packaging and the first wireless communicating device being embedded in a customer-facing surface of the first packaging.

14. The system of claim 12, the inventory management processor being integral to the second wireless communicating device.

15. The system of claim 12, further comprising a separate computing device with which the second wireless communicating device communicates to download the collected product information from the second wireless communicating device to the separate computing device, the inventor management processor being integral to the separate computing device.

16. The system of claim 12, the inventory management server being further programmed to:
   receive updated product information via at least one of a manual input from a user or through communication with a product information source other than the first wireless communicating device; and
   direct communicating of the updated product information to the first communicating device with the second communicating device,
   the updated product information being stored in the first communicating device.

17. The system of claim 12, further comprising a third wireless communicating device, the third wireless communicating device being one of a stand-alone receive-only wireless communicating device or an Internet-enabled wireless communicating device including a product information receiving application,
   the first wireless communicating device communicating the stored product information to the third wireless communicating device automatically based on a proximity of the third wireless communicating device to the first wireless communicating device.

18. The system of claim 12, the stored product information including one or more of product identification information, product pricing information, product promotional information, product nutritional information, and product shelf-life information.

19. The system of claim 12, wherein the voltage spike establishing one-way only communication from the second packaging to only the first wireless communicating device is configured to communicate a tallyable event of the second packaging.

20. A non-transitory computer readable medium having executable instructions recorded thereon that, when executed by a processor, cause the processor to execute steps of a method for managing inventory, comprising:
   receiving first packaging enclosing a plurality of products individually enclosed in second packaging, a first wireless communicating device being a near field communication device of limited range embedded in the first packaging with product information regarding the plurality of products enclosed in the first packaging being stored in the first wireless communicating device, the second packaging enclosing respective ones of the plurality of products each including a label with a magnet;
   generating a voltage spike by the magnet when placed within the limited range of the near field communication device of the first wireless communicating device;
   tallying respective ones of the plurality of products for each of the voltage spikes;
   establishing communication between a second wireless communicating device and the first wireless communicating device to collect stored product information, the second wireless communicating device being different than the plurality of products or magnets thereof;
   analyzing the product information collected by the second wireless communicating device; and
   directing output of the analysis to a user of the second wireless communicating device.

* * * * *